United States Patent
Landy et al.

(10) Patent No.: US 12,328,313 B2
(45) Date of Patent: Jun. 10, 2025

(54) SYSTEMS, METHODS, AND APPARATUSES FOR VERIFYING AUTHENTICATION CREDENTIALS IN AN ELECTRONIC NETWORK

(71) Applicant: BANK OF AMERICA CORPORATION, Charlotte, NC (US)

(72) Inventors: Marci Anne Landy, Waxhaw, NC (US); Daniel Joseph Serna, The Colony, TX (US); Tina Berumen Pachorek, Centennial, CO (US); Jessica Hope Thompson, Grapevine, TX (US); Joseph Henry Pindell, Jr., Euless, TX (US); Mrunal Mody, Keller, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 139 days.

(21) Appl. No.: 17/944,716

(22) Filed: Sep. 14, 2022

(65) Prior Publication Data

US 2024/0089256 A1   Mar. 14, 2024

(51) Int. Cl.
H04L 9/40 (2022.01)

(52) U.S. Cl.
CPC ........ H04L 63/0876 (2013.01); H04L 63/107 (2013.01)

(58) Field of Classification Search
CPC .......................... H04L 63/0876; H04L 63/107
(Continued)

(56) References Cited

U.S. PATENT DOCUMENTS

| | | | |
|---|---|---|---|
| 7,685,279 B2 | 3/2010 | Miltonberger | |
| 7,929,535 B2 * | 4/2011 | Chen | H04W 4/029 709/217 |

(Continued)

FOREIGN PATENT DOCUMENTS

| | | |
|---|---|---|
| CN | 106682051 A | 5/2017 |
| CN | 110366097 A | 10/2019 |

(Continued)

OTHER PUBLICATIONS

James A. Muir; Internet Geolocation: Evasion and Counterevasion; ACM: 2009; pp. 1-23.*

*Primary Examiner* — Monjur Rahim
(74) *Attorney, Agent, or Firm* — Moore & Van Allen PLLC; Lauren M. Stokes

(57) ABSTRACT

Systems, computer program products, and methods are described herein for verifying authentication credentials in an electronic network. The present invention is configured to receive a first IP address associated with a first access attempt; determine a first geolocation data based on the first IP address; receive a second IP address associated with a second access attempt; determine a second geolocation data based on the second IP address; determine a geolocation variance between the first and the second geolocation data; determine, based on the geolocation variance, an indication of potential movement between the access attempts; apply, based on the indication of potential movement, a verification machine learning model to the account identifier; generate, by the verification machine learning model, a privacy score; and generate, based on the privacy score, an alert user interface component to configure a GUI of a device associated with the user of the account.

20 Claims, 13 Drawing Sheets

(58) Field of Classification Search
USPC .......................................................... 726/4
See application file for complete search history.

(56) References Cited

U.S. PATENT DOCUMENTS

| | | | |
|---|---|---|---|
| 7,984,064 B2 | 7/2011 | Fusari | |
| 8,295,898 B2 | 10/2012 | Ashfield | |
| 8,364,969 B2 | 1/2013 | King | |
| 8,374,634 B2* | 2/2013 | Dankar | G06Q 20/384 |
| | | | 370/328 |
| 8,656,458 B2 | 2/2014 | Heffez | |
| 8,949,941 B2 | 2/2015 | Whelan | |
| 9,178,894 B2 | 11/2015 | O'Connor et al. | |
| 9,326,138 B2 | 4/2016 | Wynn | |
| 10,021,108 B2* | 7/2018 | Mankovskii | H04L 63/105 |
| 10,057,269 B1 | 8/2018 | Ellingson | |
| 10,623,962 B2 | 4/2020 | Pashkov | |
| 11,012,861 B1* | 5/2021 | Lippert | G07C 5/008 |
| 11,055,802 B2 | 7/2021 | Jarvis | |
| 2005/0010780 A1 | 1/2005 | Kane | |
| 2006/0064758 A1 | 3/2006 | Petner | |
| 2006/0173810 A1 | 8/2006 | Hom | |
| 2011/0191838 A1 | 8/2011 | Yanagihara | |
| 2013/0160141 A1 | 6/2013 | Tseng | |
| 2015/0120572 A1* | 4/2015 | Slade | G06Q 20/3224 |
| | | | 705/73 |
| 2015/0227934 A1* | 8/2015 | Chauhan | G06Q 20/3224 |
| | | | 705/44 |
| 2024/0086569 A1 | 3/2024 | Landy | |

FOREIGN PATENT DOCUMENTS

| | | |
|---|---|---|
| EP | 3151505 A1 | 4/2017 |
| ES | 2701613 T3 | 2/2019 |
| JP | 2016535902 A | 11/2016 |
| KR | 102308846 B1 | 10/2021 |

* cited by examiner

SYSTEMS, METHODS, AND APPARATUSES FOR VERIFYING AUTHENTICATION CREDENTIALS IN AN ELECTRONIC NETWORK

FIELD OF THE INVENTION

The present invention embraces systems, methods, and apparatuses for verifying authentication credentials in an electronic network.

BACKGROUND

Users in electronic networks have a harder time than ever before keeping their authentication credentials for each of their accounts secure. This is especially true when hackers and third parties can intercept, overhear, and/or misappropriate authentication credentials at any time they wish. A need exists for high security protocols that prevent the unauthorized accessing of accounts using authentication credentials which may have fallen into the wrong hands. However, there also exists a need to not unduly burden the user of the account, or the user of the account's trusted friends, family, and coworkers by locking them out whenever an authentication attempt occurs by someone other than the user of the account.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for verification of authentication credentials in an electronic network is presented. The system may include at least one memory device with computer-readable program code stored thereon, and at least one processing device operatively coupled to the at least one memory device and the at least one communication device, wherein executing the computer-readable code is configured to cause the at least one processing device to: receive a first IP address associated with a first access attempt of an account at a first time and an account identifier; determine a first geolocation data of the first access attempt based on the first IP address; receive a second IP address associated with a second access attempt of the account at a second time and the account identifier; determine a second geolocation data of the second access attempt based on the second IP address; determine a geolocation variance between the first geolocation data of the first access attempt at the first time and the second geolocation data of the second access attempt at the second time; determine, based on the geolocation variance, an indication of potential movement between the first access attempt at the first time and the second access attempt at the second time; apply, based on the indication of potential movement, a verification machine learning model to the account identifier; generate, by the verification machine learning model, a privacy score; determine whether the privacy score satisfies at least one of a first threshold or a second threshold; and generate, in response to the determination that the privacy score satisfies at least one of the first threshold or the second threshold, an alert user interface component to configure a graphical user interface of a device associated with the user of the account.

In some embodiments, the processing device is further configured to: determine, based on the geolocation variance, an indication of impossible movement between the first access attempt at the first time and the second access attempt at the second time; and automatically deny, in response to the determination of the indication of impossible movement, access to the account.

In some embodiments, the processing device is further configured to: collect a set of access logs associated with the account identifier, the set of access logs comprising a plurality of previous access attempts associated with the account identifier; create a first training set comprising the collected set of access logs; and train the verification machine learning model in a first stage using the first training set.

In some embodiments, the processing device is further configured to: automatically allow, in response to the determination that the privacy score fails to meet the first threshold and the second threshold, access to the account.

In some embodiments, the processing device is further configured to: receive, from the device associated with the user of the account, an indication of an improper authentication; and deny access, in response to receiving the improper authentication, to the account.

In some embodiments, the first access attempt comprises a first device identifier. In some embodiments, the second access attempt comprises the first device identifier.

In some embodiments, the second access attempt comprises a second device identifier.

In some embodiments, the processing device is further configured to: apply a threat level machine learning model to the account identifier; and generate, by the threat level machine learning model, a threat level indication of the account associated with the account identifier, the threat level indication comprising at least one of a high threat level, a medium threat level, or a low threat level. In some embodiments, the processing device is further configured to: deny, in response to the generation of the high threat level, access to the account. In some embodiments, the processing device is further configured to: allow, in response to the generation of the low threat level, access to the account. In some embodiments, the processing device is further configured to: generate, in response to the generation of the medium threat level, a threat alert user interface component to configure a graphical user interface of a device associated with the user of the account. In some embodiments, the processing device is further configured to: collect a set of application logs associated with the account identifier, the set of application logs comprising data of previous access to a plurality of applications by the account and permissions associated with the account; and train the threat level machine learning model using the set of application logs.

In another aspect, a computer program product for verification of authentication credentials in an electronic network is presented. The computer program product may include at least one non-transitory computer-readable medium having computer-readable program code portions embodied therein, the computer-readable program code portions which when executed by a processing device are configured to cause the processor to: receive a first IP address associated with a first access attempt of an account at a first time and an account identifier; determine a first geolocation data of the first access attempt based on the first IP address; receive a second IP address associated with a second access attempt of the account at a second time and the account identifier; determine a second geolocation data of the second access attempt based on the second IP address; determine a geolocation variance between the first geolocation data of the first access attempt at the first time and the second geolocation data of the second access attempt at the second time; determine, based on the geolocation variance, an indication of potential movement between the first access attempt at the first time and the second access attempt at the second time; apply, based on the indication of potential movement, a verification machine learning model to the account identifier; generate, by the verification machine learning model, a privacy score; determine whether the privacy score satisfies at least one of a first threshold or a second threshold; and generate, in response to the determination that the privacy score satisfies at least one of the first threshold or the second threshold, an alert user interface component to configure a graphical user interface of a device associated with the user of the account.

In some embodiments, the processing device processing device is further configured to cause the processor to: determine, based on the geolocation variance, an indication of impossible movement between the first access attempt at the first time and the second access attempt at the second time; and automatically deny, in response to the determination of the indication of impossible movement, access to the account.

In some embodiments, the processing device processing device is further configured to cause the processor to: receive, from the device associated with the user of the account, an indication of an improper authentication; and deny access, in response to receiving the improper authentication, to the account.

In some embodiments, the processing device processing device is further configured to cause the processor to: apply a threat level machine learning model to the account identifier; and generate, by the threat level machine learning model, a threat level indication of the account associated with the account identifier, the threat level indication comprising at least one of a high threat level, a medium threat level, or a low threat level.

In another aspect, a computer-implemented method for verification of authentication credentials in an electronic network is provided. The computer-implemented method comprising: receiving a first IP address associated with a first access attempt of an account at a first time and an account identifier; determining a first geolocation data of the first access attempt based on the first IP address; receiving a second IP address associated with a second access attempt of the account at a second time and the account identifier; determining a second geolocation data of the second access attempt based on the second IP address; determining a geolocation variance between the first geolocation data of the first access attempt at the first time and the second geolocation data of the second access attempt at the second time; determining, based on the geolocation variance, an indication of potential movement between the first access attempt at the first time and the second access attempt at the second time; applying, based on the indication of potential movement, a verification machine learning model to the account identifier; generating, by the verification machine learning model, a privacy score; determining whether the privacy score satisfies at least one of a first threshold or a second threshold; and generating, in response to the determination that the privacy score satisfies at least one of the first threshold or the second threshold, an alert user interface component to configure a graphical user interface of a device associated with the user of the account.

In some embodiments, the computer-implemented method further comprising: determining, based on the geolocation variance, an indication of impossible movement between the first access attempt at the first time and the second access attempt at the second time; and automatically denying, in response to the determination of the indication of impossible movement, access to the account.

In some embodiments, the computer-implemented method further comprising: applying a threat level machine learning model to the account identifier; and generating, by the threat level machine learning model, a threat level indication of the account associated with the account identifier, the threat level indication comprising at least one of a high threat level, a medium threat level, or a low threat level.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
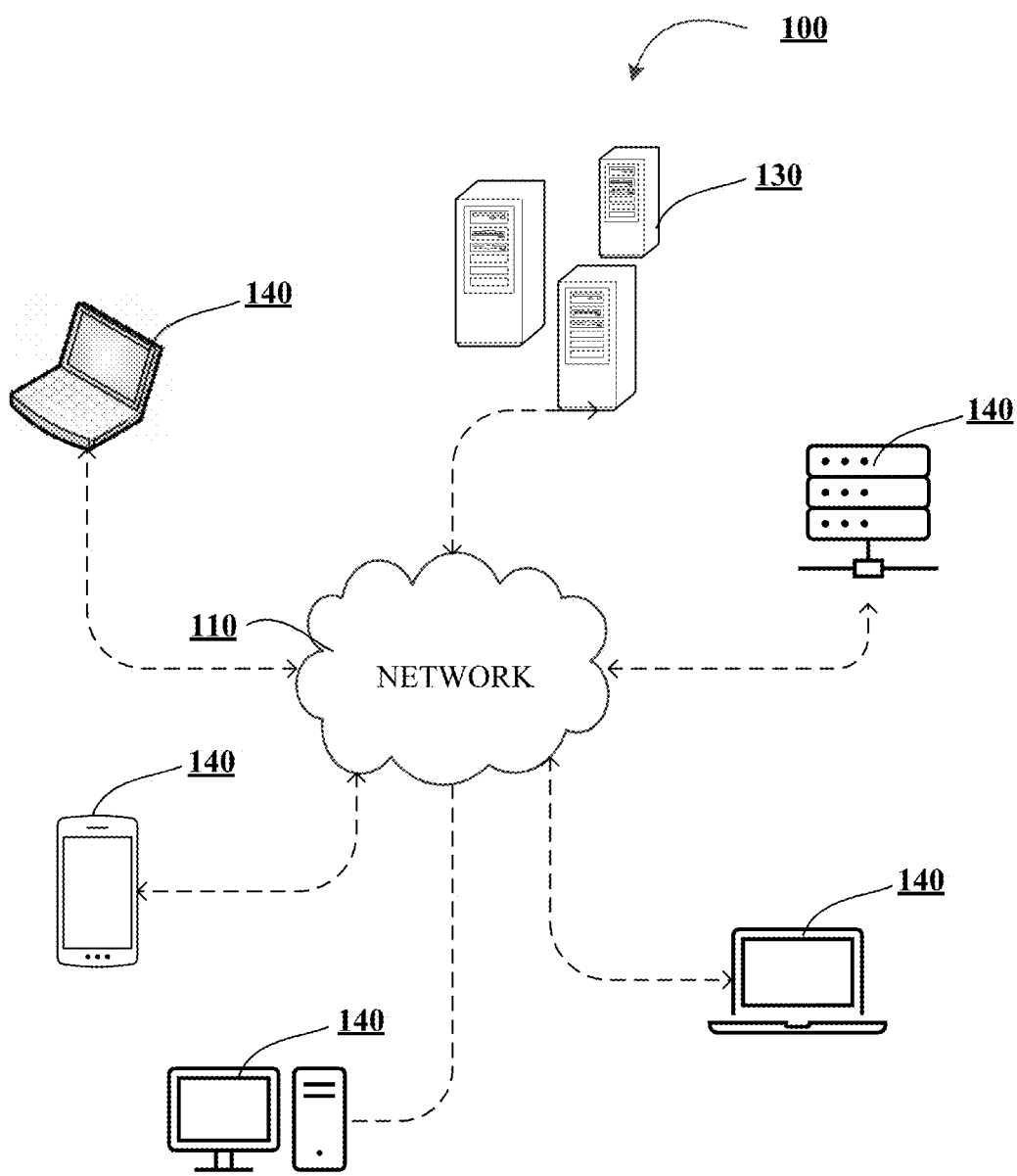
Figure 1B:
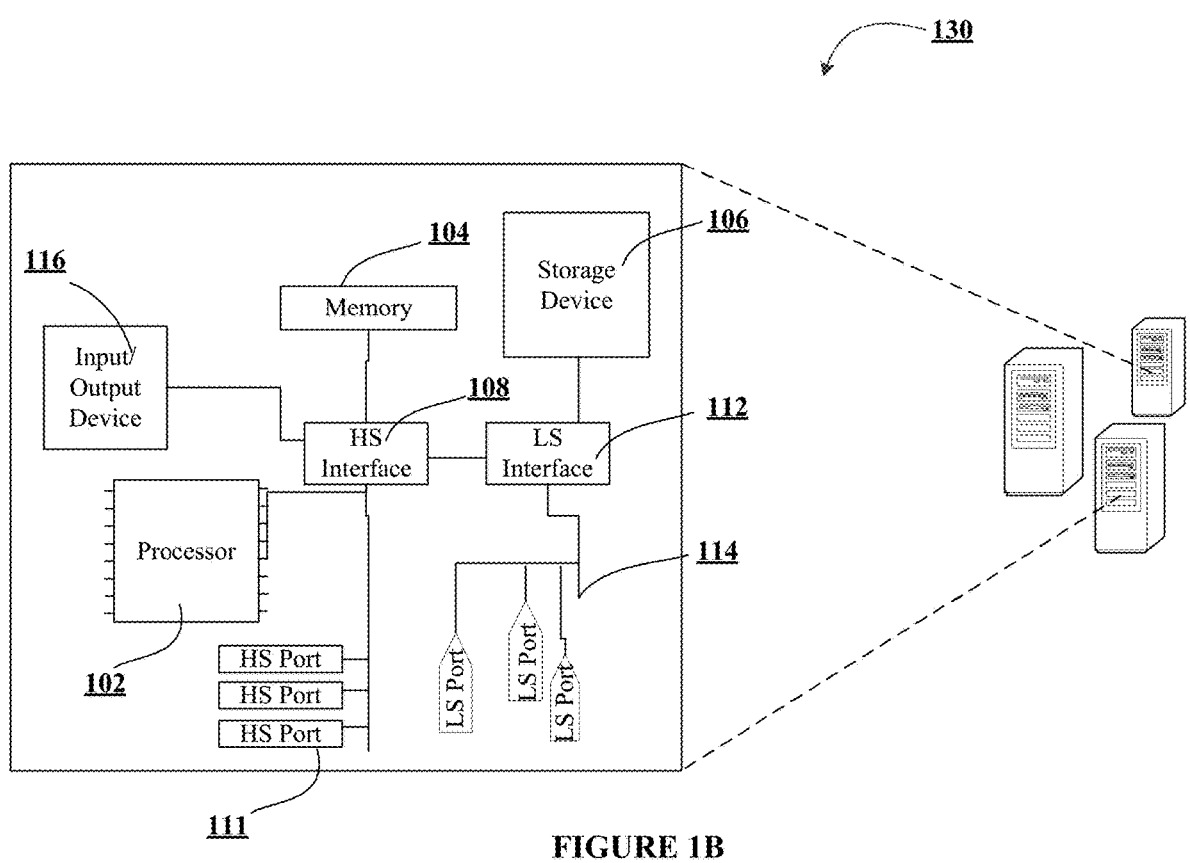
Figure 1C:
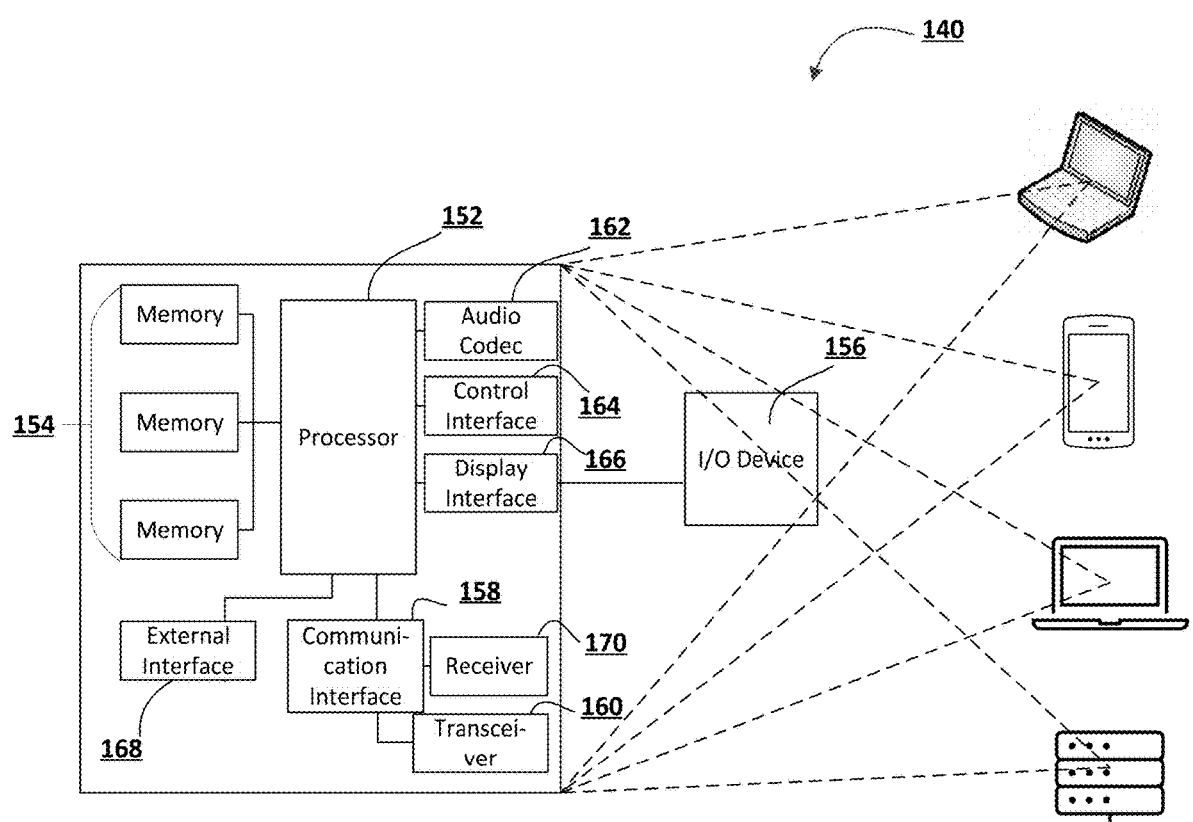
Figure 2:
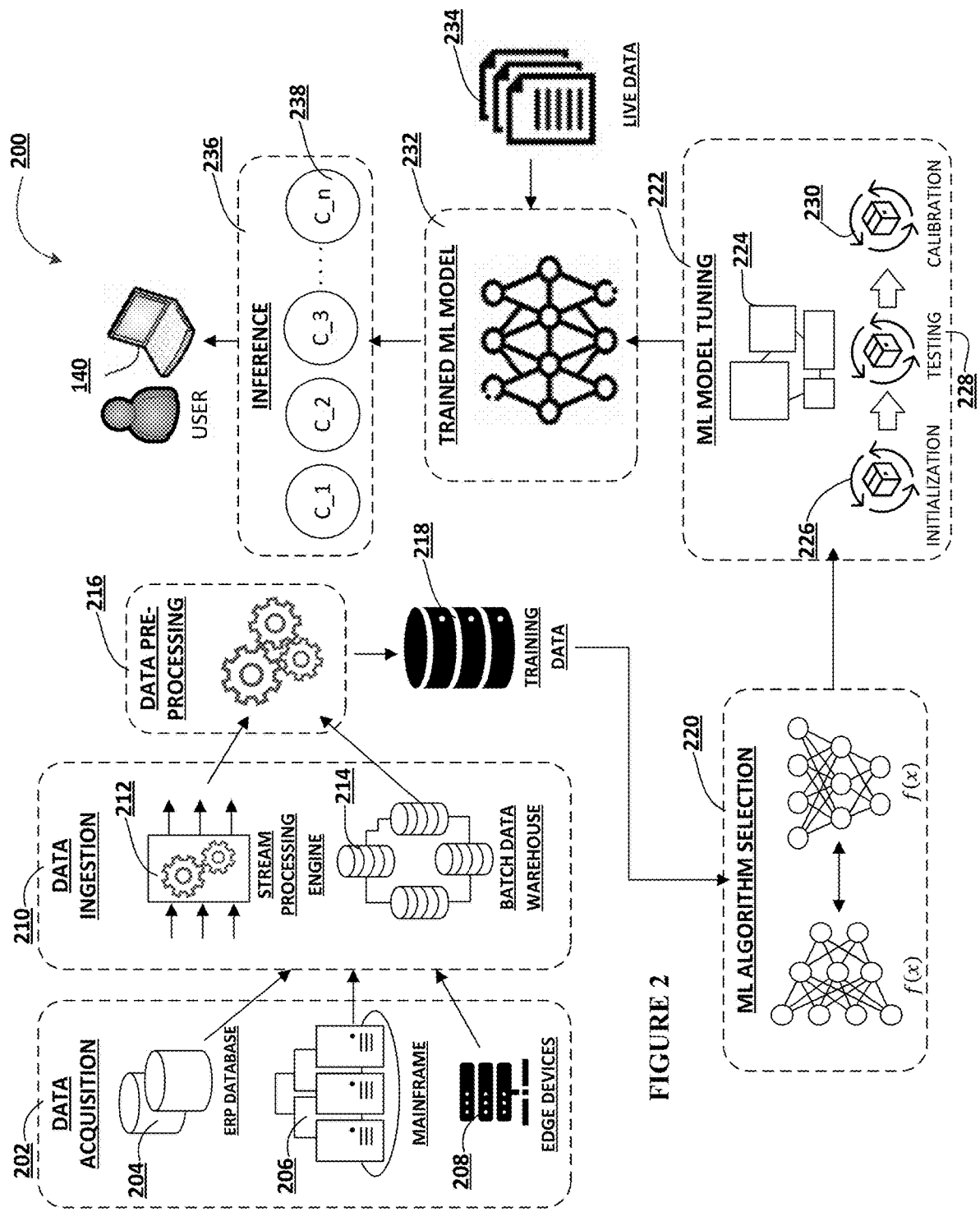

Having thus described embodiments of the invention in general terms, reference will now be made the accompanying drawings, wherein:

FIGS. 1A-1C illustrates technical components of an exemplary distributed computing environment for verifying authentication credentials in an electronic network, in accordance with an embodiment of the invention;

FIG. 2 illustrates an exemplary machine learning (ML) subsystem architecture, in accordance with an embodiment of the invention.

Figure 3:
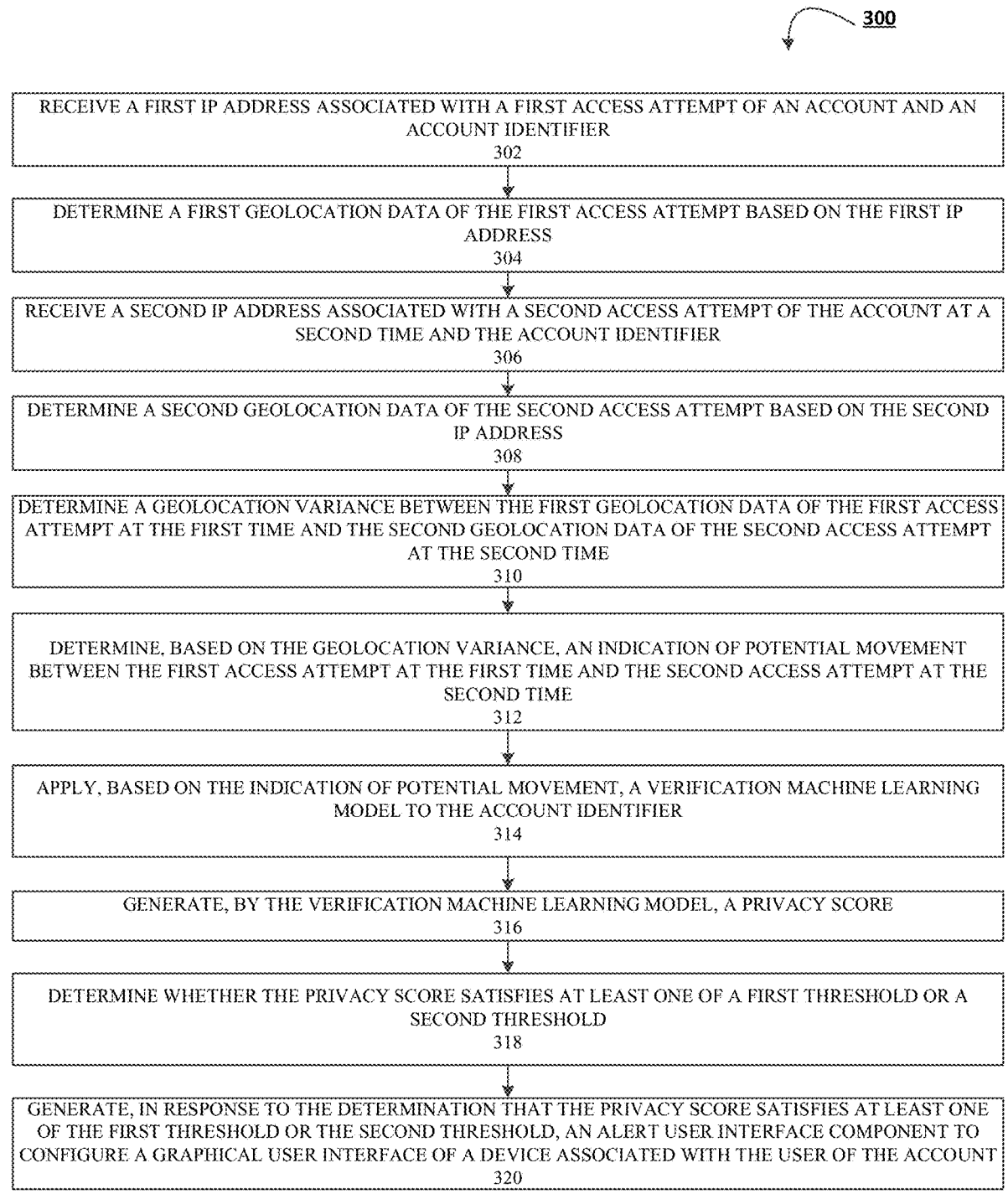

FIG. 3 illustrates a process flow for verifying authentication credentials in an electronic network by generating an alert user interface component to configure a graphical user interface of a device associated with the user of the account, in accordance with an embodiment of the invention.

Figure 4:
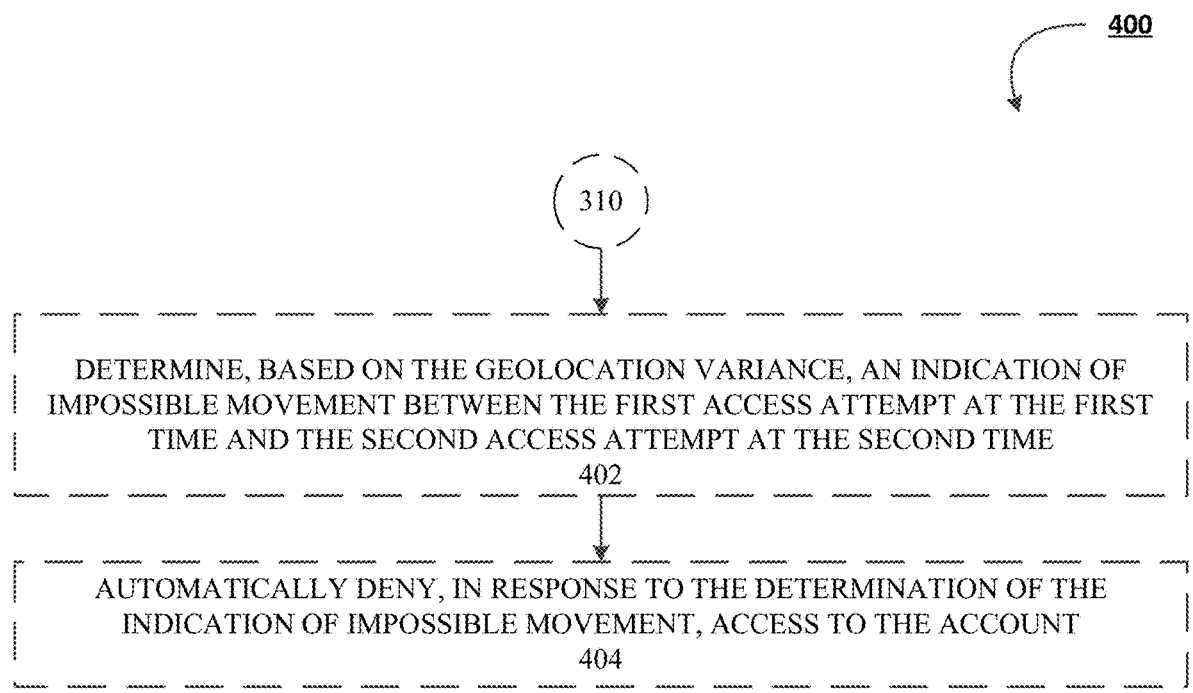

FIG. 4 illustrates a process flow for verifying authentication credentials in an electronic network by denying access to the account based on the determination of the indication of impossible movement between IP addresses, in accordance with an embodiment of the invention.

Figure 5:
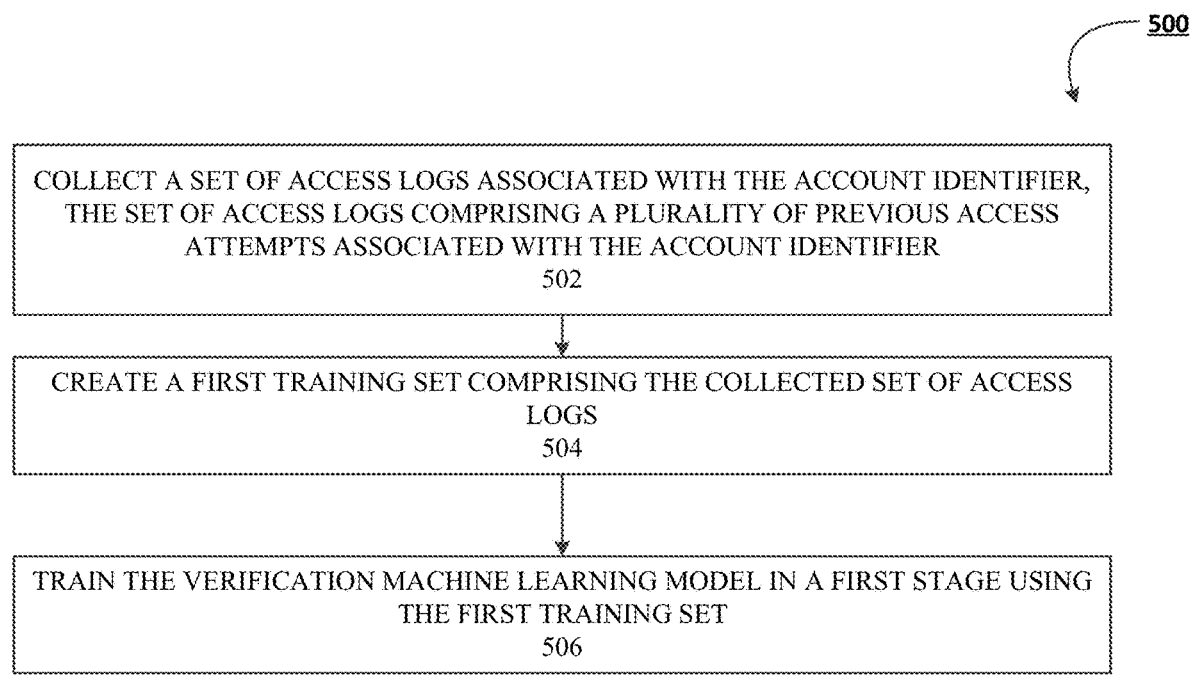

FIG. 5 illustrates a process flow for verifying authentication credentials in an electronic network by training the verification machine learning model, in accordance with an embodiment of the invention.

Figure 6:
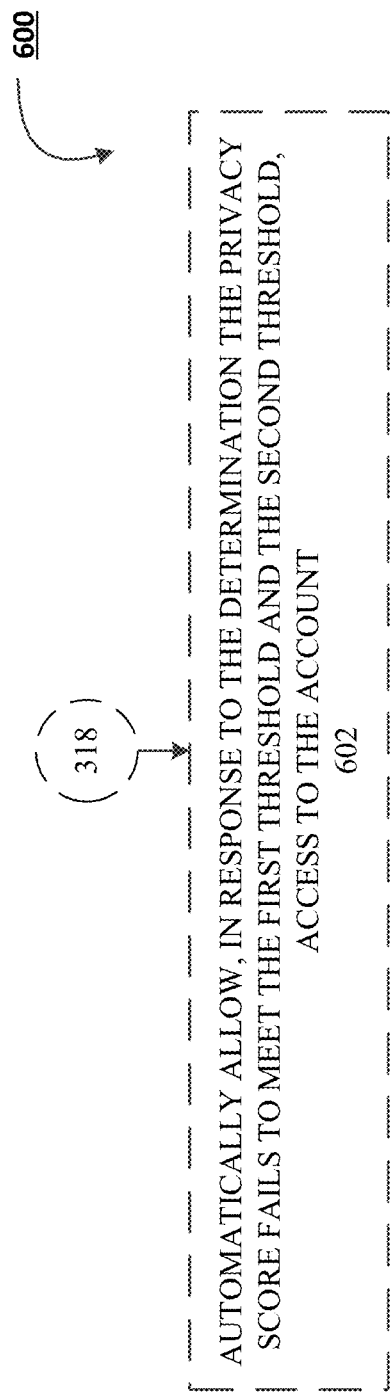

FIG. 6 illustrates a process flow for verifying authentication credentials in an electronic network by allowing access to the account based on a privacy score failing to meet the first threshold and second threshold, in accordance with an embodiment of the invention.

Figure 7:
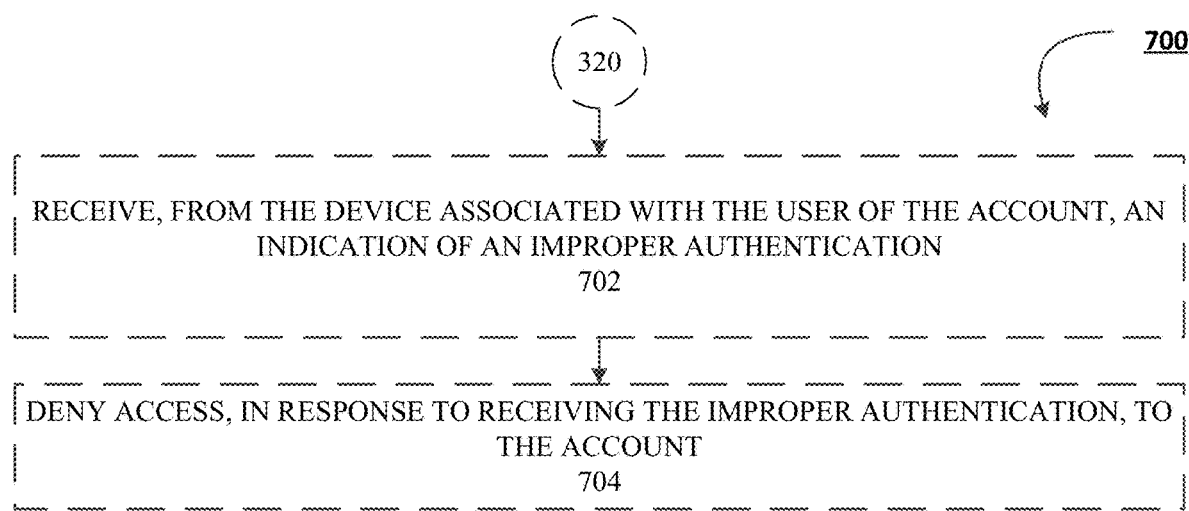

FIG. 7 illustrates a process flow for verifying authentication credentials in an electronic network by denying access to the account based on a receipt of improper authentication from the device associated with a user of the account, in accordance with an embodiment of the invention.

Figure 8:
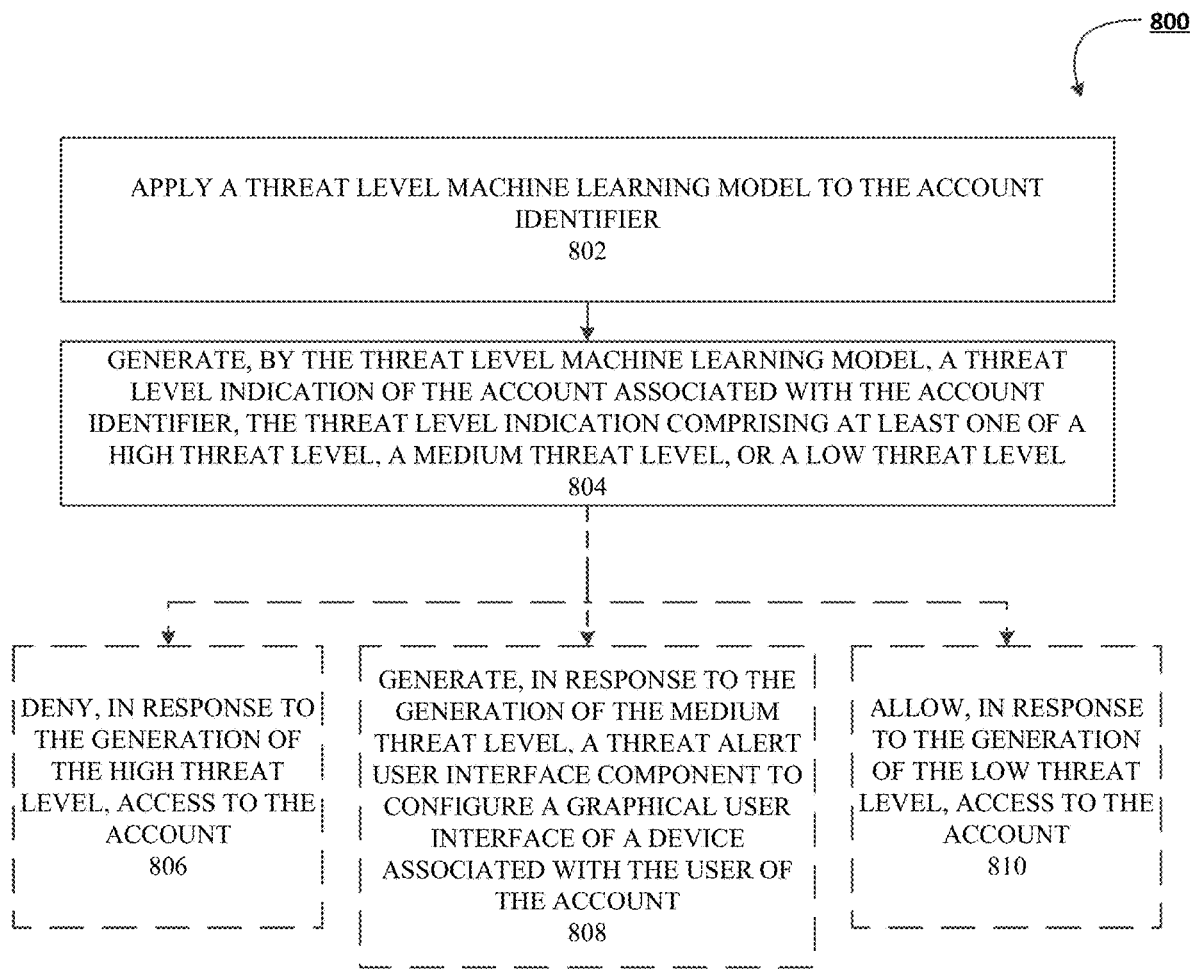

FIG. 8 illustrates a process flow for verifying authentication credentials in an electronic network by denying access to an account, allowing access to an account, or generating a threat alert user interface component based on an output of a threat level machine learning model, in accordance with an embodiment of the invention.

Figure 9:
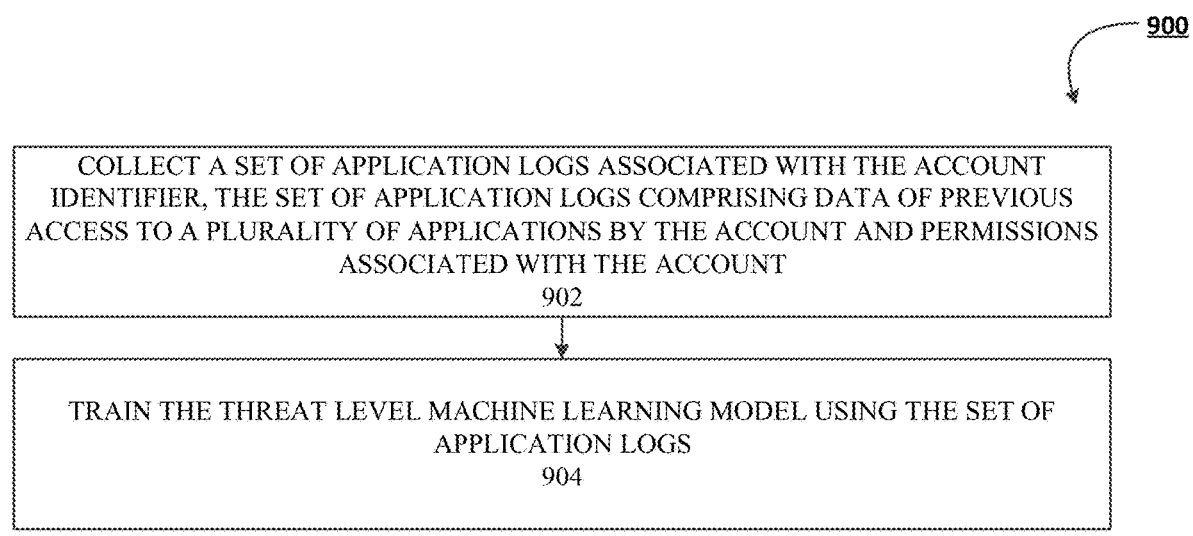

FIG. 9 illustrates a process flow for verifying authentication credentials in an electronic network by training the threat level machine learning model, in accordance with an embodiment of the invention.

Figure 10A:
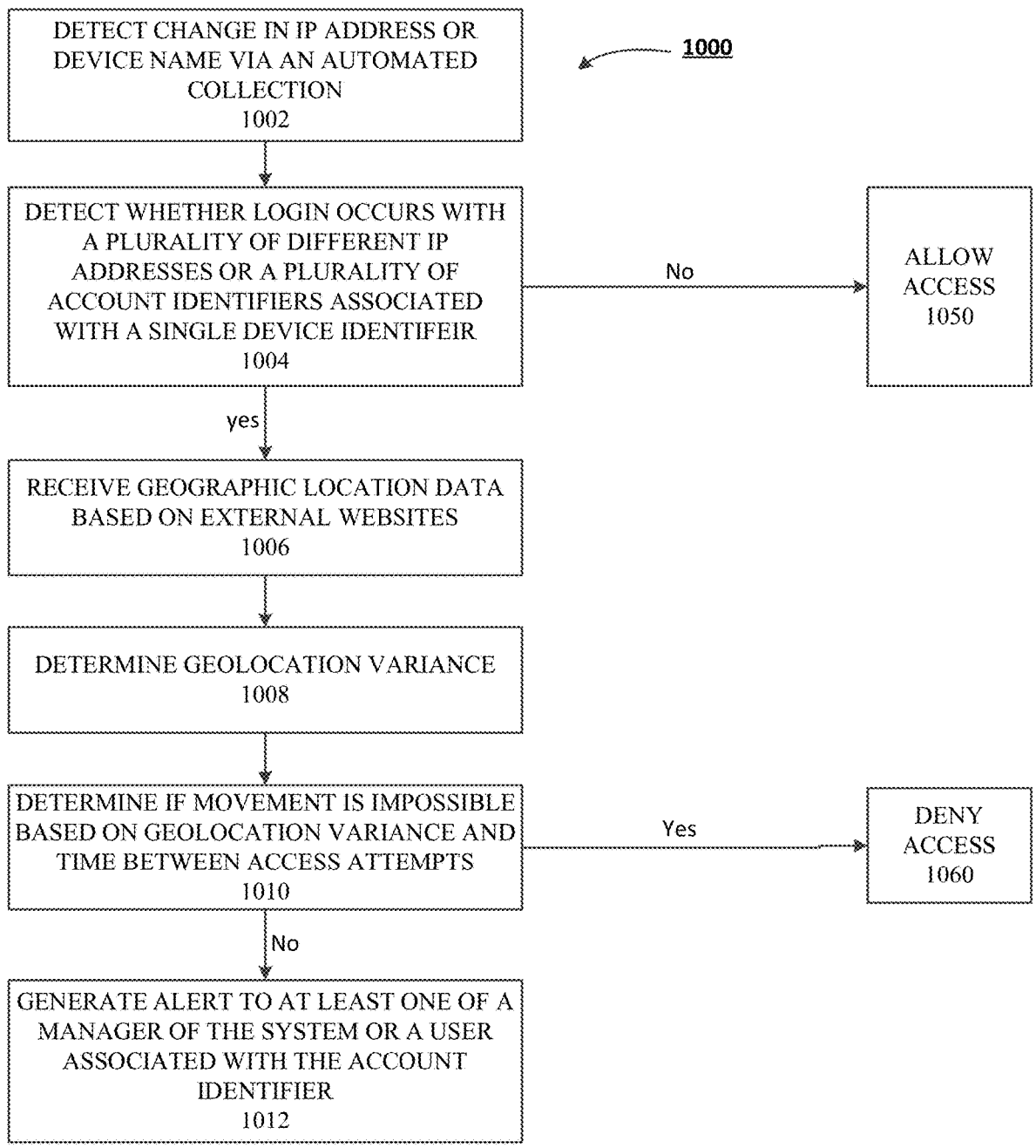
Figure 10B:
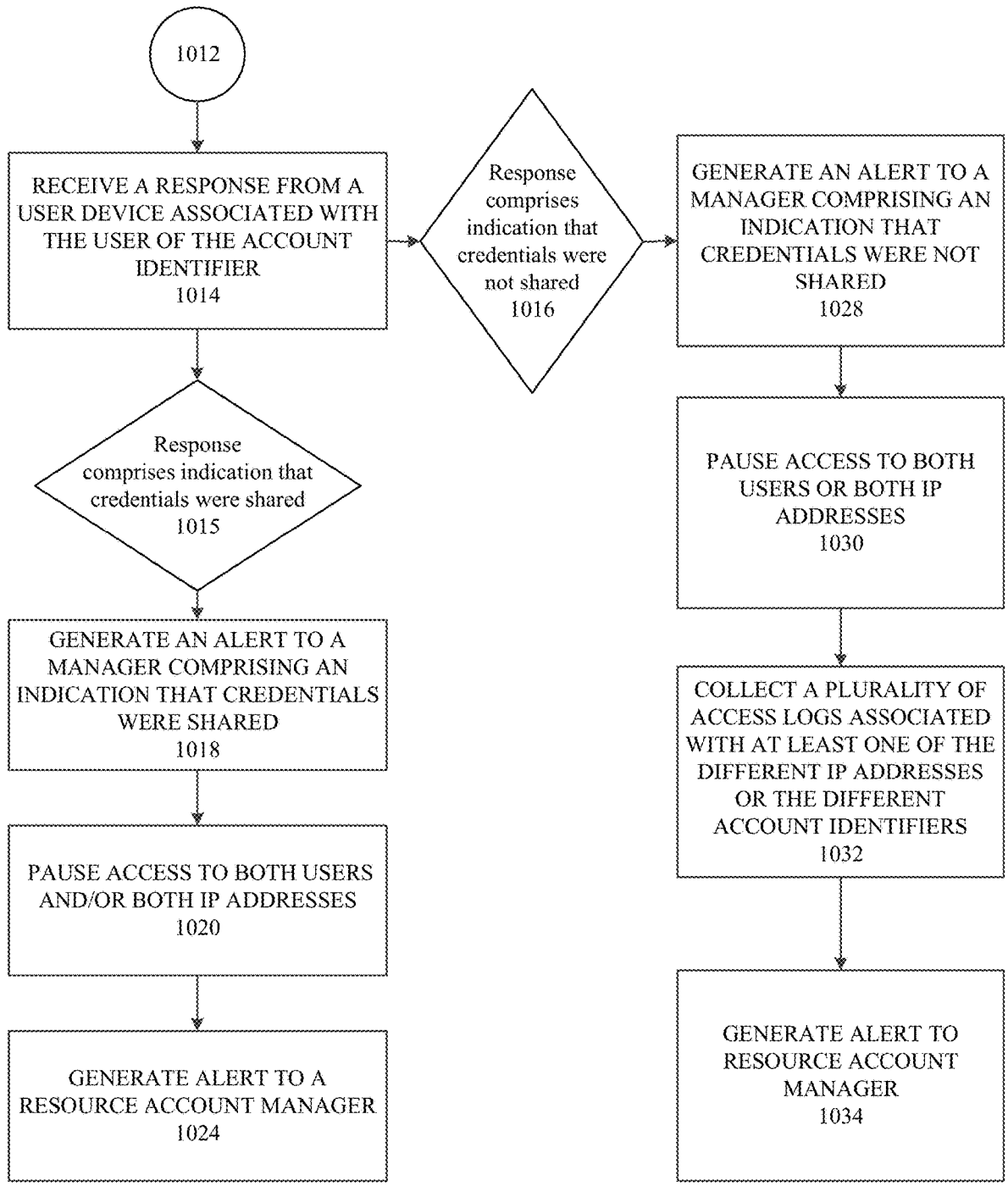

FIG. 10A-10B illustrates a process flow for verifying authentication credentials in an electronic network, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity. In some embodiments, the user may be a registered or unregistered client and/or customer of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository—a storage location where one or more resources are organized, stored and retrieved electronically using a computing device.

As used herein, an "account identifier" may generally refer to one or more data elements by which an account associated with the entity and/or authentication credential verification system may be uniquely identified. The account identifier may include, without limitation, a name, an email address, a phone number, a bank account number, a social security number, and/or the like. The account identifier may include, for example, one or more of Internet Protocol (IP) addresses associated with the user's device, numerical characters, alphabetical characters, alphanumeric codes, American Standard Code for Information Interchange (ASCII) characters, identification certificates, the like, or combinations thereof. An account identifier may be associated with a user account data object within an authentication credential verification system. For example, an account identifier may be used to associate one or more bank accounts with a particular user, wherein the verified user (e.g., original user that set up the account) is referred herein as the "user of the account."

As described in further detail herein, the present invention provides a solution to the above-referenced problems in the field of technology by generating an accurate and efficient verification process for authentication credentials used in similar or different circumstances (e.g., similar locations, similar times, similar networks, and/or the like). The present invention solves this technical problem by implementing an authentication credentials verification system, like that shown as system 130 in FIGS. 1A-1C. For instance, the authentication credentials verification system acts to verify each and/or most instances where a user attempts to access an account and it cannot be confirmed outright that the user of the account (i.e., the verified user of the account who set up the account and is directly associated with the account) is the person attempting to access the account, currently. However, it is also important to make sure if the user of the account (or a trusted agent of the user of the account, such as their family, friends or coworkers who received the authentication credentials intentionally from the user of the account) not be unduly burdened by high security measures whenever it cannot be outright confirmed that the user of the account would grant access for the account, such as access by the user of the account's family, friends, or trusted coworkers.

Accordingly, the authentication credentials verification system works by receiving a first IP address associated with a first access attempt of an account at a first time and an account identifier; determining a first geolocation data of the first access attempt based on the first IP address; receiving a second IP address associated with the second access attempt of the account at a second time and the account identifier; determining a second geolocation data of the second access attempt based on the second IP address; determining a geolocation variance between the first geolocation data of the first access attempt at the first time and the second geolocation data of the second access attempt at the second time; determining, based on the geolocation variance, an indication of potential movement between the first access attempt at the first time and the second access attempt at the second time; applying, based on the indication of potential movement, a verification machine learning model to the account identifier; generating, by the verification machine learning model, a privacy score; determining whether the privacy score satisfies at least one a first threshold or a second threshold; and generating, in response to the determination that the privacy score satisfies at least one of the first threshold or the second threshold, an alert user interface component to configure a graphical user interface of a device associated with the user of the account.

What is more, the present invention provides a technical solution to a technical problem. As described herein, the technical problem includes the verification of authentication credentials that have been unintentionally and intentionally shared in an electronic network environment by differentiating by machine learning model(s) which access attempts are based on the unintentional sharing of the authentication credentials and which access attempts are based on the intentional sharing of the authentication credentials. The technical solution presented herein allows for training machine learning models to automatically determine whether to grant access to an account, wherein the determination may be based on IP addresses of a plurality of access attempts, the device identifiers of the plurality of access attempts, geolocation variance data between access attempts, and/or proxy logs of previous interactions with each account access is attempted. In particular, verification of authentication credentials is an improvement over existing solutions to the verification of authentication credentials, (i) with fewer steps to achieve the solution, thus reducing the amount of computing resources, such as processing resources, storage resources, network resources, and/or the like, that are being used to verify each individual access attempt as they are received and verified separately; (ii) providing a more accurate solution to problem, thus reducing the number of resources required to remedy any errors made due to a less accurate solution, such as those generated by human error or computing error as data regarding each access attempt is shared between multiple computing resources before a single output (e.g., a verification of the authentication credentials) is generated; and (iii) removing manual input and waste from the implementation of the solution, thus improving speed and efficiency of the process and conserving computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for verifying authentication credentials in an electronic network 100, in accordance with an embodiment of the invention. As shown in FIG. 1A, the distributed computing environment 100 contemplated herein may include a system 130 (i.e., an authentication credential verification), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer—or machine—readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP).

Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making predictions about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1, C\_2 \ldots C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1, C\_2 \ldots C\_n$ 238) live data 234 based on how similar they are to one another to solve exploratory challenges where little is known about the data, provide a description or label (e.g., $C\_1, C\_2 \ldots C\_n$ 238) to live data 234, such as in classification, and/or the like. These categorized outputs, groups (clusters), or labels are then presented to the system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow 300 for verifying authentication credentials in an electronic network by generating an alert user interface component to configure a graphical user interface of a device associated with the user of the account, in accordance with an embodiment of the invention. In some embodiments, a system (e.g., similar to one or more of the systems described herein with respect to FIGS. 1A-1C and 2) may perform one or more of the steps of process flow 300. For example, an authentication credential verification system (e.g., the system 130 described herein with respect to FIG. 1A-1C) may perform the steps of process flow 300).

As shown in block 302, the process flow 300 may include the step of receiving a first IP address associated with a first access attempt of an account and an account identifier. The IP addresses disclosed herein (i.e., first IP address, second IP address, third IP address, fourth IP address, and/or the like) comprise identifiers which may comprise a combination of numbers, letters, or symbols. These IP addresses which may be used to identify a device on a network. The IP addresses may be transmitted from a device, such as a first device that is associated with a first access attempt of an account, over a network (e.g., network 110) to system 130 to carry out the objectives described herein.

In some embodiments, an account identifier may also be transmitted over a network, along with the first IP address, to the system 130. By way of non-limiting example, the account identifier may comprise a plurality of numbers, letters, or symbols to identify the specific account sought to be accessed using authentication credentials in the first access attempt. In some embodiments, the account identifier may be used to uniquely identify an account within the authentication credential verification system along with any associated data associated with the account and/or data comprised within a database associated with the account which may include, but is not limited to, bank account information (checking account data, savings account data, wire transfer number(s), and/or the like), name(s), social security number(s), address(es), phone number(s), and/or the like.

In some embodiments, the access attempt may comprise a user inputting data into a client device (e.g., client device 140) in communication with the authentication credential verification system (e.g., system 130) over a network 110. By way of a non-limiting example, a user of the one or more client devices 140 may input data into an interface of the client device 140 configured by the authentication credential verification system to request authentication credentials associated with the account identifier. For instance, an account identifier may further comprise data of the authentication credentials required to access the account associated with the account identifier such that input of the wrong authentication credentials into the authentication credential verification system by the client device interface may be invalidated by the authentication credential verification system. By way of non-limiting example, the authentication credentials input into the client device 140 by a user and via a authentication credential verification system configured graphical user interface which requests authentication credentials, the authentication credentials may further comprise the account identifier associated with an account within the authentication credential verification system such as a user account id (e.g., username, bank account number, email address, and/or the like) to identify the account within the authentication credential verification system.

Each of the authentication credentials transmitted to the authentication credential verification system for access to an account may be considered an access attempt as described herein. By way of non-limiting example, if the authentication credentials input and transmitted to the authentication credential verification system are incorrect, do not match any of the authentication credentials within the memory 104 and/or storage device 106 of the system 130, the authentication credentials are missing one or more characters, and/or the account associated with the account identifier is frozen or paused for login, the input and transmission of these authentication credentials are still considered as part of an access attempt. Additionally, if the authentication credentials are input and transmitted to the authentication credential verification system 130 and comprise correct authentication credentials and would allow access to an associated account (e.g., the username and passcode are correct and access is allowed), this instance may also be considered an access attempt.

In some embodiments, when the authentication credentials are input into the client device 130 by way of an authentication credential verification system configured graphical user interface, the authentication credential verification system may access a storage device 106 and/or a memory 104 to identify an account identifier associated with the specific authentication credentials. In this manner, the authentication credentials are stored separate from the data of the account associated with the account identifier.

In some embodiments, once the authentication credentials have been input into the client device 140 in communication with the authentication credential verification system, the authentication credentials are transmitted over the network 110 to the authentication credential verification system for identification of an account identifier associated with the authentication credentials.

As shown in block 304, the process flow 300 may include the step of determining a first geolocation data of the first access attempt based on the first IP address. By way of non-limiting example, the geolocation may be determined based on the IP address associated with the access attempt at the time of the access attempt. For instance, the first IP address may be used to generate location data using an API (application programming interface) and/or JSON file. In some embodiments, the geolocation data may also be generated by way of a machine learning model trained to generate a client device's location data by inputting the IP address of the access attempt.

In some embodiments, a geolocation data may also be based on input by the user by an authentication credential verification system configured GUI of the client device. In this manner, the geolocation data may be input by the user as a specific street address, a city and/or town, a state, a country, and/or the like. In some embodiments, the geolocation data may be based at different times, including in real-time as the user is attempting to access the account(s) and/or based on previous times the user has attempted to access the account(s).

As shown in block 306, the process flow 300 may include the step of receiving a second IP address associated with a second access attempt of the account at a second time and the account identifier. By way of non-limiting example, a second access attempt may be received from the client device 140 associated with the same user associated with the first access attempt on the same first device. In some embodiments, the second access attempt may be received from the client device 140 associated with the same user associated with the first access attempt on a different, second device. In some embodiments, the second access attempt may be received from a client device associated with a user different from the first access attempt, but may be on the same device as the first access attempt or may be on a device different from the first access attempt. In any of these embodiments, a second IP address associated with the second access attempt maybe received by the authentication credential verification system, which may further comprise the second access attempt of the account at the second time (e.g., after the first time of the first access attempt) and the same account identifier as the first access attempt.

In some embodiments, the second access attempt may comprise a different account identifier and may trigger the same system/authentication verification by the authentication credential verification system if the second access attempt is generated on the same device as the first access attempt. By way of non-limiting example, the devices (e.g., client devices 140) and their associated device identifiers (e.g., such as by a unique serial number associated with each device, IMEI number, and/or the like) may be tracked by system 130 (i.e., authentication credential verification) at each access attempt and their associated times (e.g., a first access attempt and the associated time, a second access attempt at a second time, a third access attempt at a third time, a fourth access attempt at a fourth time, and/or the like). The device identifier(s) and its associated effects on the flow diagram described herein is described in further detail below with respect to FIGS. 10A-10B.

As shown in block 308, the process flow 300 may include the step of determining a second geolocation data of the second access attempt based on the second IP address. In some embodiments, the second geolocation data may include different geolocation coordinates, geolocation address, and/or the like from the first geolocation data, wherein such a difference may indicate a movement between the first access attempt and the second access attempt. In some embodiments, the second geolocation data and the first geolocation data may comprise the same geolocation coordinates, geolocation address, and/or the like and may indicate a lack of movement between the first access attempt and the second access attempt. Further, in some embodiments, the second IP address, while being used to determine the second geolocation data, may further be used to determine the time of the second access attempt.

As shown in block 310, the process flow 300 may include the step of determining a geolocation variance between the first geolocation data of the first access attempt at the first time and the second geolocation data of the second access attempt at the second time. By way of a non-limiting example, the geolocation variance may be determined as the distance between the first geolocation data and the second geolocation data (e.g., a distance between the first geolocation coordinates and the second geolocation coordinates, and/or a distance between the first geolocation address and the second geolocation address). In some embodiments, such a distance may be determined as miles, kilometers, yards, feet, inches, and/or the like.

In some embodiments, the geolocation variance may be zero and may indicate that the first geolocation data comprises the same location data as the second geolocation data to show that the user has attempted access to the account at the same location at the first time and the second time (e.g., a user of the access attempts has moved and gone back to the same spot or has not moved at all between time periods).

As shown in block 312, the process flow 300 may include the step of determining, based on the geolocation variance, an indication of potential movement between the first access attempt at the first time and the second access attempt at the second time. By way of non-limiting example, the determination of the potential movement between the first access attempt at a first time and the second access attempt at a second access attempt may be based on both the geolocation variance and a variance between the first time for the first access attempt and the second time for the second access attempt. By way of non-limiting example, the variance between the time of access attempts may be determined as years, months, weeks, days, hours, minutes, and/or seconds. Such a potential movement may indicate that the geolocation variance between the first time and the second time is possible or likely for the same user of the first access attempt and the second access attempt. By way of non-limiting example, if a user attempts to the account at location X at 0800 (i.e., 8:00 am EST) and then the "user" (e.g., the alleged same user and/or a different user under the guise of being the same user) attempts to access the account a second time at location Y (which is located 10 miles away from location X) at 0830 (i.e., 8:30 am EST), the authentication credential verification system may indicate that such a movement between the first geolocation data and the second geolocation data is possible and an indication of potential movement is determined/generated by the system. In some embodiments, the movement between the first geolocation data and the second geolocation data is impossible and this instance is described in more detail below with respect to FIG. 4.

In some embodiments, such an indication of potential movement may be determined by an AI engine and/or a machine learning model trained using a collection of geolocation data and geolocation variance data, and variance between the plurality of times of access attempts for each geolocation data.

As shown in block 314, the process flow 300 may include the step of applying, based on the indication of potential movement, a verification machine learning model to the account identifier. By way of non-limiting example, the verification machine learning model may output a verification of authentication credentials based upon an analysis of the account identifier associated with the first access attempt and the second access attempt. For instance, if the first access attempt comprises authentication credentials associated with a first account identifier and the second access attempt comprises authentication credentials associated with the same first account identifier, then the verification machine learning model may, in some instances, automatically pull (i.e., collect and/or access a database of logs) access logs (e.g., proxy logs) associated with the account identifier in order to determine if the access attempt(s) (e.g., first access attempt, second access attempt, third access attempt, fourth access attempt, and/or the like) are similar to previous iterations of access by the user. The verification machine learning model may, in some embodiments, refer to previous interactions by the user of the account to determine if the user often gives out their authentication credentials to certain entities/individuals (e.g., their spouse, children, other family members, executive assistants, and/or other trusted third parties); if the account is typically accessed at certain times of the year, month, and/or day to determine if it is likely that the user associated with the account is in fact the user attempting access in real-time (e.g., at a first access attempt, at a second access attempt, at a third access attempt, at a fourth access attempt, and/or the like); if the account is typically accessed on certain networks (e.g., on a secured home network); if the account is typically accessed by a certain device (e.g., on a specific mobile device, tablet, and/or computing device); if the account is typically accessed at certain locations (e.g., when the user is at their office, at their designated home, and/or the like); and other such data collected in the access logs.

Based on such data collected in the access logs, the verification machine learning model may determine that the user is likely to share their authentication credential with certain entities/individuals (e.g., their spouse), and if the account is also accessed at a typical location (e.g., the house that both the user of the account and the user's spouse share), then the verification machine learning model may determine that there is a low-likelihood that the authentication credentials were shared improperly with an untrusted party. In contrast, the verification machine learning model may determine, based on the access logs and the current access attempt, that the authentication credentials were shared improperly such as where the access attempt(s) is received by a location atypical to the access logs (e.g., at a restaurant not previously found in the access logs) and/or at an atypical time of day (e.g., in the middle of the night at the user's geolocation).

As shown in block 316, the process flow 300 may include the step of generating, by the verification machine learning model, a privacy score. In some embodiments, the privacy score may be output by the verification machine learning model as a low privacy score, medium privacy score, and/or high privacy score. Such privacy scores may indicate a likelihood that the credentials have been shared in an unauthorized or improper manner. By way of non-limiting example, a low privacy score may indicate that the credentials were not shared at all and the user associated with the account is the same user attempting access in real-time at the first access attempt and at the second access attempt. Additionally, and in some embodiments, a medium privacy score may indicate that the credentials were shared in an authorized manner such as within a household or between spouses, but for which the user of the account is likely not the user attempting access in at least the second access attempt. Additionally, and in some embodiments, a high privacy score may indicate that the credentials were shared in an unauthorized manner such as by hacking of the account.

As shown in block 318, the process flow 300 may include the step of determining whether the privacy score satisfies at least one of a first threshold or a second threshold. In some embodiments, the type and/or level of privacy score may be determined by the privacy score satisfying one or more thresholds (e.g., satisfying a first threshold and/or a second threshold). In some embodiments, if the privacy score that is output by the verification machine learning model does not satisfy either a first threshold or a second threshold, the privacy score may be considered a low privacy score. In some embodiments, if the privacy score that is output by the verification machine learning model satisfies only a first threshold and fails to satisfy a second threshold, the privacy score may be considered a medium privacy score. In some embodiments, if the privacy score that is output by the verification machine learning model satisfies both a first threshold and a second threshold, the privacy score may be considered a high privacy score.

In some embodiments the first threshold and the second threshold may be predetermined by the user of the authentication credential verification system, by a manager of the authentication credential verification system, and/or by a manager of the specific account associated with the access attempts.

In some embodiments, the authentication credential verification system may automatically allow access to account upon determining a low privacy score (e.g., the failure of the privacy score to meet either the first threshold or the second threshold). Such an embodiment is described in further detail below with respect to FIG. 6.

As shown in block 320, the process flow 300 may include the step of generating, in response to the determination that the privacy score satisfies at least one of the first threshold or the second threshold, an alert user interface component to configure a graphical user interface of a device associated with the user of the account. In some embodiments, the alert user interface component may be generated by the authentication credential verification system and transmitted via a network—such as the network 110 shown in FIG. 1A—to a device associated with the user for the account where access was attempted (e.g., the client device of the user of the account, which may differ from the client device used for the plurality of access attempts). In some embodiments, once the alert user interface component has been transmitted to the user of the account's device, it may be used to configure the graphical user interface of the user of the account's device to indicate that an attempt of access has been paused, halted, and/or stopped by the authentication credential verification system and to request further input from the user of the account.

By way of non-limiting example, if the privacy score satisfies a first threshold and/or a second threshold such that a medium privacy score and/or a high privacy score is output, then the authentication credential verification system may generate an alert user interface component to configure a user interface of a device associated with the authentication credential verification system to indicate to the user of the account that an access attempt has been paused, halted, and/or stopped by the authentication credential verification system.

In some embodiments, an alert user interface component may configure a graphical user interface of a device associated with the user of the account only when the authentication credential verification system determines that the privacy satisfies both the first threshold and the second threshold (e.g., a high privacy score).

Such an alert user interface component may comprise graphical user interface components which may indicate that an unauthenticated session with the account associated with the account identifier is about to occur and/or has been requested to occur. In some embodiments, the alert user interface component may comprise a graphical user interface component that requests input by the user of the account to indicate that the access attempt associated with the medium privacy score or the high privacy score should be allowed (i.e., granted access to the account). In some embodiments, the alert user interface component may comprise a graphical user interface component that requests input by the user of the account to alert a manager of the authentication credential verification system that an unauthenticated or improper session with the account is about to occur and should be stopped. The process of generating an alert to a user of the account and/or to the manager is further disclosed below with respect to FIG. 10A-10B.

In some embodiments, an indication received by the user device indicating that the authentication credentials were shared in an inauthentic or improper manner may be received by the authentication credential verification system. In such embodiments, upon receipt of this improper authentication, the authentication credential verification system may automatically deny access. Such an embodiment is described in more detail below with respect to FIG. 7.

FIG. 4 illustrates a process flow 400 for automatically denying, in response to a determination of the indication of impossible movement, access to the account, in accordance with an embodiment of the invention. In some embodiments, a system (e.g., similar to one or more of the systems described herein with respect to FIGS. 1A-1C and 2) may perform one or more of the steps of process flow 400. For example, an authentication credential verification system (e.g., the system 130 described herein with respect to FIG. 1A-1C) may perform the steps of process flow 400.

As shown in block 402, the process flow 400 may include the step of determining, based on the geolocation variance, an indication of impossible movement between the first access attempt at the first time and the second access attempt at the second time.

In some embodiments, the indication of impossible movement is an indication that movement is impossible (and, in some embodiments, highly improbable) between the geolocations at the first time of the first access attempt and the second time of the second access attempt. By way of non-limiting example, if a user attempts to access the account at location X at 0800 (i.e., 8:00 am EST) and then the "user" (e.g., the alleged user of the account who attempted access at the first time and/or a different user under the guise of being the same user of the account who attempted access at the first time) attempts to access the account a second time at location Y (which is located 700 miles away from location X) at 0830 (i.e., 8:30 am EST), the authentication credential verification system may indicate that such a movement between the first geolocation data and the second geolocation data is impossible and an indication of impossible movement is determined and/or generated by the authentication credential verification system.

In some embodiments, the authentication credential verification system is configured to give an indication of impossible movement based on a high improbability of inauthentic credentials (e.g., inauthentic or improper credential sharing) which may have been shared intentionally by the valid user (e.g., the user of the account) associated with the account of the account identifier or which may have been shared unintentionally (e.g., by hacking, by overhearing, and/or the like) by the user of the account or the user of the account's associated devices.

As shown in block 404, the process flow 400 may include the step of automatically denying, in response to the determination of the indication of impossible movement, access to the account. In some embodiments, the authentication credential verification system may automatically deny access by pausing access to the account for a predetermined time (set by the system and/or its manager(s)), by placing a hold on the account (until the authentic sharing of credentials has been verified by the system and/or by the user of the account), and/or by indefinitely holding the account (which may depend on the settings of the system and/or the predefined settings of each individual account (e.g., set up by the user of the account)). By way of non-limiting example, if an account is known by the user and/or the manager of the system to comprise particularly harmful data if accessed by the wrong individual and/or entity, then the account may be locked indefinitely to mitigate the harm done by accessing the data.

FIG. 5 illustrates a process flow 500 for verifying authentication credentials in an electronic network by training the verification machine learning model, in accordance with an embodiment of the invention. In some embodiments, a system (e.g., similar to one or more of the systems described herein with respect to FIGS. 1A-1C and 2) may perform one or more of the steps of process flow 500. For example, an authentication credential verification system (e.g., the system 130 described herein with respect to FIG. 1A-1C) may perform the steps of process flow 500.

As shown in block 502, the process flow 500 may include the step of collecting a set of access logs associated with the account identifier, the set of access logs comprising a plurality of previous access attempts associated with the account identifier.

In some embodiments, the set of access logs may be a set of proxy logs. In some embodiments, the set of access logs (e.g., proxy logs) may comprise data regarding previous interactions of a user associated with the account identifier which include, but are not limited to previous interactions with particular websites before, during, and after access has been granted to the account; previous geolocation data of accessing the account; previous timestamps of access to the account (e.g., timestamps of times of year the account was accessed, specific months the account was accessed, specific weeks the account was accessed, specific days of the week the account was accessed, specific times of day the account was accessed, and/or the like); certain networks the account was accessed on; and/or the like.

In some embodiments, the set of access logs may further comprise data regarding attempts to access the account, wherein the account was not accessed but the account credentials were partly correct and/or fully correct and submitted to the authentication credential verification system. By way of non-limiting example, such an attempt where access was unable to be granted may have been due to a single credential (e.g., a passcode) being incorrect, a network interruption, a server disruption, and/or the like.

As shown in block 504, the process flow 500 may include the step of creating a first training set comprising the collected set of access logs.

In some embodiments, a training set (e.g., the first training set) may be generated based on the collected set of access logs which comprise access data associated with a plurality of account identifiers (e.g., a plurality of accounts) such that a single verification machine learning model is trained for a plurality of accounts.

In some embodiments, the training set (e.g., the first training set) may be generated based on a collected set of access logs associated with a single account identifier, such that a verification machine learning model is trained for each account identifier and a plurality of verification machine learning models are comprised within the authentication credential verification system.

As shown in block 506, the process flow 500 may include the step of training the verification machine learning model in a first stage using the first training set.

In some embodiments, the verification machine learning model is trained for a plurality of accounts, such that only a single verification machine learning model is used within the authentication credential verification system and it is trained using a first training set comprising the collected set of access logs associated with a plurality of account identifiers.

In some embodiments, a verification machine learning model may be generated and trained for each particular account, such that each account has its own verification machine learning model.

In some embodiments, the verification machine learning model may be continuously trained using a feedback loop based on indications received by the user of the account when a privacy score is determined and an alert user interfaced component is used to configure a graphical user interface of the device associated with the user of the account. By way of non-limiting example, if the indication received by the authentication credential verification system from the user of the account when the privacy score is returned as a medium privacy score and/or a high privacy score, then the indication that the authentication credentials were shared properly or improperly may be fed back to the verification machine learning model for further training.

FIG. 6 illustrates a process flow 600 for verifying authentication credentials in an electronic network by allowing access to the account based on privacy score failing to meet the first threshold and second threshold, in accordance with an embodiment of the invention. In some embodiments, a system (e.g., similar to one or more of the systems described herein with respect to FIGS. 1A-1C and 2) may perform one or more of the steps of process flow 600. For example, an authentication credential verification system (e.g., the system 130 described herein with respect to FIG. 1A-1C) may perform the steps of process flow 600.

As shown in block 602, the process flow 600 may include the step of automatically allowing, in response to the determination that the privacy score fails to meet the first threshold and the second threshold, access to the account. In some embodiments, the access to the account may be automatically allowed after a low privacy score has been determined by the verification machine learning model. Such a low privacy score may indicate that the authentication credentials were not shared by the user (e.g., either intentionally or unintentionally) and the plurality of access attempts (e.g., the first access attempt and/or the second access attempt were generated by the user of the account).

In some embodiments, the low privacy score may indicate that the authentication credentials were shared by the user of the account, but the authentication credentials were shared in an acceptable fashion (e.g., such as between spouses, between parent and child, between employee and employer, between contractor and client, and/or the like).

FIG. 7 illustrates a process flow 700 for verifying authentication credentials in an electronic network by denying access to the account based on a receipt of improper authentication from the device associated with a user, in accordance with an embodiment of the invention. In some embodiments, a system (e.g., similar to one or more of the systems described herein with respect to FIGS. 1A-1C and 2) may perform one or more of the steps of process flow 700. For example, an authentication credential verification system (e.g., the system 130 described herein with respect to FIG. 1A-1C) may perform the steps of process flow 700.

As shown in block 702, the process flow 700 may include the step of receiving, from the device associated with the user of the account, an indication of an improper authentication.

In some embodiments, the indication of an improper authentication may comprise an alert to the manager of the authentication credential verification system and/or an alert to the system itself. The indication may comprise computer-readable code to the authentication credential verification system that neither the user of the account nor an actor associated with the user of the account (e.g., a verified actor the user of the account is aware of and granted access to the account) attempted access to the account. In some embodiments, the indication of an improper authentication may configure the graphical user interface of the device associated with the manager of the authentication credential verification system to indicate the improper authentication and allow the manager to deny access and/or the graphical user interface of the device associated with the manager may indicate access has been automatically denied.

As shown in block 704, the process flow 700 may include the step of denying access, in response to receiving the improper authentication, to the account. In some embodiments, the denial of access may comprise a pause, a halt, or an indefinite hold on the account. Similarly, and as already described above, such a denial of access may be predetermined by the user and/or the manager of the authentication credential verification system and/or may be automatically implemented, such as without user interaction.

FIG. 8 illustrates a process flow 800 for verifying authentication credentials in an electronic network by denying access to an account, allowing access to an account, or generating a threat alert user interface component based on an output of a threat level machine learning model, in accordance with an embodiment of the invention. In some embodiments, a system (e.g., similar to one or more of the systems described herein with respect to FIGS. 1A-1C and 2) may perform one or more of the steps of process flow 800. For example, an authentication credential verification system (e.g., the system 130 described herein with respect to FIG. 1A-1C) may perform the steps of process flow 800.

As shown in block 802, the process flow 800 may include the step of applying a threat level machine learning model to the account identifier.

In some embodiments, a threat level machine learning model may be used to identify a specific threat level of each account based on the data comprised within the account that may be accessed by a user of the system (e.g., a verified user, such as the user of the account or associated users like the user of the account's spouse, and/or an un-verified user such as the user requesting access to the account) and particular permissions allowed by the system for the user to access (e.g., other accounts comprising other data) that may—when combined with other, particular account data—can be detrimental if accessed by the same person or entity. By way of non-limiting example, if a user allowed access to Account A which comprises data associated with social security numbers of a plurality of employees within a company, and the same user has access to Account B which comprises data associated with bank account numbers of the same plurality of employees, could be detrimental in certain circumstances and could lead to an appropriation of employee identities.

In some embodiments, the threat level machine learning model may be trained using a plurality of application logs like that described in further detail below with respect to FIG. 9.

As shown in block 804, the process flow 800 may include the step of generating, by the threat level machine learning model, a threat level indication of the account associated with the account identifier, the threat level indication comprising at least one of a high threat level, a medium threat level, or a low threat level. In some embodiments, the threat levels may be generated based on a first threat level threshold and a second threat level threshold, which may be pre-determined by a user of the account and/or a manager of the authentication credential verification system. Similar to the privacy scores generated in FIG. 3, if the threat level fails to satisfy either the first threat level threshold or the second threat level threshold, a low threat level is generated. Additionally, if the threat level satisfies the first threat level threshold but fails to satisfy the second threat level threshold, a medium threat level is generated. Additionally, if the threat level satisfies both a first threat level threshold and a second threat level threshold, a high threat level is generated. Such threshold levels may be predetermined by a user of the authentication credential verification system, a manager of the authentication credential verification system, or the authentication credential verification system itself after properly training the threat level machine learning model. The training of the threat level machine learning model is described in more detail below with respect to FIG. 9.

Threat level may indicate a likelihood of threat that the contents of the account comprise highly sensitive data such as non-public information or personally identifying information (PII), wherein the permissions associated with account to access or permission to access certain data (e.g., the different types of highly sensitive data may be a threat if a single user has access to a plurality of certain types of data). In some embodiments, if two accounts comprise highly sensitive data and both accounts may be accessed by the same user, then a high threat level may be generated. In some embodiments, if a first account comprises highly sensitive data and a second account comprises low sensitive data (e.g., names of employees), and both accounts may be accessed by the same user, then a medium threat level may be generated. In some embodiments, if one account comprises low sensitive data (e.g., names of employees) and the second account also comprises low sensitive data (e.g., phone numbers of employees), and both accounts may be accessed by the same user, then a low threat level may be generated.

In some embodiments, the determination of whether data associated with an account is highly sensitive may be determined by a counting of how often certain data is identified in the account (e.g., the number of times a 9-digit number shows up which may be likened to a social security number, a bank account, and/or the like). The more these numbers appear, the higher the sensitivity of the data within the account. In some embodiments, if a 9-digit code appears at all, the account is automatically identified as comprising highly sensitive data.

In some embodiments, and as shown in block 806, the process flow 800 may include the step of denying, in response to the generation of the high threat level, access to the account.

In some embodiments, the denial of access to the account may comprise an automatic pause or complete halt to the account. In some embodiments, once the denial has occurred, the authentication credential verification system may generate a threat level alert user interface component to configure a graphical user interface of a device associated with the manager of the authentication credential verification system and/or the account(s). In some embodiments, the manager of the authentication credential verification system and/or the account(s) may indicate that the attempt access is acceptable, in some embodiments, and instruct the system to allow access to one or both of the accounts.

In some embodiments, and as shown in block 808, the process flow 800 may include the step of generating, in response to the generation of the medium threat level, a threat alert user interface component to configure a graphical user interface of a device associated with the manager of the authentication credential verification system and/or the account(s).

In some embodiments, an automatic denial of access may occur in response to the generation of a medium threat level. In some embodiments, the authentication credential verification system may automatically allow access to the account in response to the generation of a medium threat level. In some embodiments, such a response by the authentication credential verification system may be predetermined by the manager of the authentication credential verification system and/or the account(s) (such that access is limited to the specific account(s) and/or the user requesting access to the account(s)).

In some embodiments, and as shown in block 810, the process flow 800 may include the step of allowing, in response to the generation of the low threat level, access to the account.

In some embodiments, the authentication credential verification system may pause access to generate an alert (e.g., a threat alert user interface component) to be transmitted to a device associated with the manager of the authentication credential verification system and/or the account(s), such that the threat alert user interface component may indicate an access by a single user to a plurality of account(s) that comprise certain kinds of data. Such an alert may comprise a graphical user interface component requesting input by the manager to deny access if one or both of the account(s) should not be accessed by the user.

FIG. 9 illustrates a process flow 900 for verifying authentication credentials in an electronic network by training the threat level machine learning model, in accordance with an embodiment of the invention. In some embodiments, a system (e.g., similar to one or more of the systems described herein with respect to FIGS. 1A-1C and 2) may perform one or more of the steps of process flow 900. For example, an authentication credential verification system (e.g., the system 130 described herein with respect to FIG. 1A-1C) may perform the steps of process flow 900.

As shown in block 902, the process flow 900 may include the step of collecting a set of application logs associated with the account identifier, the set of application logs comprising data of previous access attempts to a plurality of applications by the account and permissions associated with the account.

In some embodiments, the set of application logs may comprise data associated with a particular account identifier (e.g., the account identifier of the account sought to be accessed) and/or data associated with a plurality of account identifiers such that the threat level machine learning model is trained to generate threat level for all of the accounts in the authentication credential verification system. In some embodiments, a plurality of threat level machine learning models may be trained and used in the authentication credential verification system such that each threat level machine learning model is trained using a set of application logs for only a single account. In some embodiments, a plurality of threat level machine learning models may be trained using a set of application logs only associated with a particular amount of accounts.

In some embodiments, the set of application logs may comprise data associated with data of pervious access attempts (e.g., access grants) to a plurality of applications and permissions granted to each account associated with each account identifier. Such permissions may indicate particular account identifiers a user may have access to, what data is comprised within each account, what the user has accessed in the past with respect to the particular data of each account, and/or the like.

As shown in block 904, the process flow 900 may include the step of training the threat level machine learning model using the set of application logs.

In some embodiments, the training of the threat level machine learning model may comprise applying the application logs to the threat level machine learning model so that the threat level machine learning model may identify which accounts comprise highly sensitive data, which accounts comprise medium sensitive data, and which accounts comprise low sensitive data and, based on such identification of the data, which accounts (when accessed by the same user) may lead to a high threat level, a medium threat level, and/or a low threat level. In some embodiments, the threat level machine learning model may be trained based on specific user patterns of previous account access patterns to determine if a user is likely to access highly sensitive data if given the opportunity (i.e., if granted access).

In some embodiments, and similar to the verification machine learning model, the threat level machine learning model may also comprise a feedback loop for future training. Such a feedback loop may comprise data of real-time indications that certain accounts should be considered as comprising highly sensitive data, medium sensitive data, and/or low sensitive data, as well as specific users that should not be granted access to particular accounts. Such a feedback loop may further, in some embodiments, be generated by a manager of the authentication credential verification system and/or the account(s).

FIG. 10A-10B illustrates a process flow 1000 for verifying authentication credentials in an electronic network, in accordance with an embodiment of the invention. In some embodiments, a system (e.g., similar to one or more of the systems described herein with respect to FIGS. 1A-1C and 2) may perform one or more of the steps of process flow 1000. For example, an authentication credential verification system (e.g., the system 130 described herein with respect to FIG. 1A-1C]) may perform the steps of process flow 1000.

As shown in block 1002, the process flow 1000 may include the step of detecting a change in IP addresses or device names via an automated collection. For instance, a change in IP addresses may indicate a change in geolocation data between each access attempt (e.g., a first access attempt and a second access attempt). In some embodiments, a detection of specific device names (e.g., device identifiers) used for each access attempt may likewise be collected and/or received by the authentication credential verification system by way of an automated collection when each access attempt occurs.

As shown in block 1004, the process flow 1000 may include the step of detecting whether each login (e.g., each access attempt) occurs with a plurality of different IP addresses or a plurality of account identifiers associated with a single device identifier.

In some embodiments, if the authentication credential verification system detects that neither of a plurality of different IP addresses nor a plurality of device identifiers are used, and the login attempts comprise a single account identifier (e.g., the same account is attempted to be accessed on one device that has a single device identifier), then access to the account may be allowed such as that shown at operation 1050. By way of non-limiting example, if an account is attempted to be accessed by two different IP addresses but from the same device comprising the same device identifier, then access may not be automatically allowed and the flow may progress to operation 1006. In some embodiments, if two different accounts are attempted to be accessed by the same device comprising the same device identifier, then access may not be automatically allowed and the flow may progress to operation 1006.

In some embodiments, if the authentication credential verification system detects that at least one of a plurality of different IP addresses or a plurality of account identifiers are associated with a single device identifier (e.g., multiple accounts are attempted to be accessed on one device that has a single device identifier), then geographic location data may be received by the authentication credential verification system such as that shown at operation 1006. In some embodiments, the geographic location may be determined based on external websites and/or applications that may determine a geographic location based on an IP address.

In some embodiments, and as shown in block 1008, the process flow 1000 may include the step of determining geolocation variance. Geolocation variance may comprise a determination, such as an algorithm and/or a calculation, of a distance between the locations of the access attempts.

In some embodiments, and as shown in block 1010, the process flow 1000 may include the step of determining if movement is impossible based on geolocation variance and time between logins. For instance, if the geolocation variance is too great a distance for the time between access attempts (e.g., the first time associated with the first access attempt and the second time associated with the second access attempt), then the movement may be considered impossible and the authentication credential verification system may deny access like that shown at operation 1060. In contrast, and in some embodiments, if the geolocation variance over the time between access attempts is possible, then the authentication credential verification system may continue to operation 1012.

In some embodiments, and as shown in block 1012, the process flow 1000 may include the step of generating an alert to at least one of a manager of the authentication credential verification system and/or a user of the account associated with the account identifier (e.g., a user of the account). In some embodiments, this alert may comprise the alert user interface component of FIG. 3, which may indicate that an improper attempt has occurred.

In some embodiments, and as shown in block 1014, the process flow 1000 may include the step of receiving a response from a user device associated with the user of the account identifier. In some embodiments, the response may be generated by a user interacting with a user of the account's client device 140 configured by the alert user interface component and may indicate whether the user of the account's authentication credentials were shared intentionally with the user attempting access.

In some embodiments, and based on the response received at operation 1014, and as shown in block 1015, the response received at operation 1014 may comprise an indication that credentials were shared in a proper manner (e.g., shared intentionally by the user of the account).

In some embodiments, and as shown in block 1018, the process flow 1000 may include the step of generating an alert to a manager comprising an indication that credentials were shared. By way of non-limiting example, the alert may comprise an indication that the credentials were shared intentionally by the user of the account showing that the user requests access be granted for the access attempt.

In some embodiments, and as shown in block 1020, the process flow 1000 may include the step of pausing access to both users and/or both IP addresses. In some embodiments, the pause of access to the account may be generated based on an automatic pause to the account by the authentication credential verification system and/or based on a manager of the authentication credential verification system and/or manager of the account's request to pause the specific account while awaiting confirmation from the user of the account that the credentials were shared intentionally. In some embodiments, once the user of the account has indicated that the authentication credentials were shared intentionally, the manager of the authentication credential verification system and/or manager of the account may reactivate and/or reallow the access attempt to continue (e.g., may allow the user to login to the account). Such a pause to the access of the account may further be limited to the user(s) (e.g., if there are a plurality of users such that each access attempt is a different user) or to both IP addresses (e.g., if there a plurality of IP addresses associated with each access attempt).

In some embodiments, and as shown in block 1022, the process flow 1000 may include the step of generating an alert to a resource account manager. In some embodiments, the resource account manager may comprise the manager of the authentication credential verification system and/or manager of the account. In some embodiments, the resource account manager may comprise an entity and/or individual associated with the manager of the account, such as an individual tasked with keeping records of who may and who may not access the account.

In some other embodiments, and once the response from the user device has been received at operation 1014, and as shown in block 1016, the response received at operation 1014 may comprise an indication that credentials were not shared. In some embodiments, this response may comprise an indication by a user of the account that the credentials were shared unintentionally (e.g., a hacker obtained the authentication credentials, the authentication credentials were misappropriated, and/or the like).

In some embodiments, and as shown in block 1028, the process flow 1000 may include the step of generating an alert to a manager comprising an indication that credentials were not shared (i.e., were not shared intentionally). By way of non-limiting example, the alert to a manager comprising the indication that the credentials were not shared may be generated by the user of the account in response to the alert user interface component and its indication of a medium privacy score or a high privacy score.

In some embodiments, and as shown in block 1030, the process flow 1000 may include the step of pausing access to both users or both IP addresses. In some embodiments, the access to the account may be automatically paused and/or manually paused by the manager of the authentication credential verification system and/or manager of the account based on the indication that the authentication credentials were not shared intentionally. Similar to operation 1020, the pause to the account may be limited to the plurality of users associated with the access attempts or to the plurality of IP addresses associated with the access attempts.

In some embodiments, and as shown in block 1032, the process flow 1000 may include the step of collecting a plurality of access logs associated with at least one of the different IP addresses or the different account identifiers. In some embodiments, the access logs may comprise data regarding websites accessed using the plurality of IP addresses, accounts accessed using the plurality of IP addresses, and/or the like. In some embodiments, the data regarding the plurality of IP addresses may be used by the authentication credential verification system to further train at least one of the verification machine learning model and/or the threat level machine learning model to identify future access attempts from the same IP addresses. In some embodiments, the different user account identifiers of the access attempts may also be collected to further train at least one of the verification machine learning model and/or the threat level machine learning model, which may be used by the machine learning model(s) to predict future access attempts where authentication credentials were not shared for each of the account identifiers. In some embodiments, the different user account identifiers may be used to alert the users of the accounts that the accounts associated with the account identifiers need updated and/or new authentication credentials as the previous authentication credentials are no longer secure.

In some embodiments, and as shown in block 1034, the process flow 1000 may include the step of generating an alert to a resource account manager. Similar to operation 1024, an alert to a resource account manager may comprise alerting a manager of the [ ] system and/or account(s), and/or may comprise alerting an entity/individual associated with the manager of the account(s), such as an individual tasked with keeping records of who may and who may not access the account(s).

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
|---|---|---|
| 17/944,746 | SYSTEMS, METHODS, AND APPARATUSES FOR IDENTIFYING UNAUTHORIZED USE OF A USER'S AUTHENTICATION CREDENTIALS TO AN ELECTRONIC NETWORK BASED ON NON-PUBLIC DATA ACCESS | Sep. 14, 2022 |

What is claimed is:

1. A system for verification of authentication credentials in an electronic network, the system comprising:
a memory device with computer-readable program code stored thereon;
at least one processing device operatively coupled to the at least one memory device and the at least one communication device, wherein executing the computer-readable code is configured to cause the at least one processing device to:
receive a first IP address associated with a first access attempt of an account at a first time and an account identifier;
determine a first geolocation data of the first access attempt based on the first IP address;
receive a second IP address associated with a second access attempt of the account at a second time and the account identifier;
determine a second geolocation data of the second access attempt based on the second IP address;
determine a geolocation variance between the first geolocation data of the first access attempt at the first time and the second geolocation data of the second access attempt at the second time;
determine, based on the geolocation variance, an indication of potential movement between the first access attempt at the first time and the second access attempt at the second time;
apply, based on the indication of potential movement, a verification machine learning model to the account identifier;
generate, by the verification machine learning model and based on the indication of potential movement, a privacy score, wherein the privacy score indicates a probability a user of the account identifier shared authentication credentials associated with the account identifier with a second user associated with the second access attempt;
determine whether the privacy score satisfies at least one of a first threshold or a second threshold; and
generate, in response to the determination that the privacy score satisfies at least one of the first threshold or the second threshold, an alert user interface component to configure a graphical user interface of a device associated with the user of the account.

2. The system of claim 1, wherein the processing device is further configured to:
determine, based on the geolocation variance, an indication of impossible movement between the first access attempt at the first time and the second access attempt at the second time; and
automatically deny, in response to the determination of the indication of impossible movement, access to the account.

3. The system of claim 1, wherein the processing device is further configured to:
collect a set of access logs associated with the account identifier, the set of access logs comprising a plurality of previous access attempts associated with the account identifier;
create a first training set comprising the collected set of access logs; and
train the verification machine learning model in a first stage using the first training set.

4. The system of claim 1, wherein the processing device is further configured to:
automatically allow, in response to the determination that the privacy score fails to meet the first threshold and the second threshold, access to the account.

5. The system of claim 1, wherein the processing device is further configured to:
receive, from the device associated with the user of the account, an indication of an improper authentication; and
deny access, in response to receiving the improper authentication, to the account.

6. The system of claim 1, wherein the first access attempt comprises a first device identifier.

7. The system of claim 5, wherein the second access attempt comprises the first device identifier.

8. The system of claim 1, wherein the second access attempt comprises a second device identifier.

9. The system of claim 1, wherein the processing device is further configured to:
apply a threat level machine learning model to the account identifier; and
generate, by the threat level machine learning model, a threat level indication of the account associated with the account identifier, the threat level indication comprising at least one of a high threat level, a medium threat level, or a low threat level.

10. The system of claim 9, wherein the processing device is further configured to:
deny, in response to the generation of the high threat level, access to the account.

11. The system of claim 9, wherein the processing device is further configured to:
allow, in response to the generation of the low threat level, access to the account.

12. The system of claim 9, wherein the processing device is further configured to:
generate, in response to the generation of the medium threat level, a threat alert user interface component to configure a graphical user interface of a device associated with the user of the account.

13. The system of claim 9, wherein the processing device is further configured to:
collect a set of application logs associated with the account identifier, the set of application logs comprising data of previous access to a plurality of applications by the account and permissions associated with the account; and
train the threat level machine learning model using the set of application logs.

14. A computer program product for verification of authentication credentials in an electronic network, wherein the computer program product comprises at least one non-transitory computer-readable medium having computer-readable program code portions embodied therein, the computer-readable program code portions which when executed by a processing device are configured to cause the processor to:
receive a first IP address associated with a first access attempt of an account at a first time and an account identifier;
determine a first geolocation data of the first access attempt based on the first IP address;
receive a second IP address associated with a second access attempt of the account at a second time and the account identifier;
determine a second geolocation data of the second access attempt based on the second IP address;
determine a geolocation variance between the first geolocation data of the first access attempt at the first time and the second geolocation data of the second access attempt at the second time;
determine, based on the geolocation variance, an indication of potential movement between the first access attempt at the first time and the second access attempt at the second time;
apply, based on the indication of potential movement, a verification machine learning model to the account identifier;
generate, by the verification machine learning model and based on the indication of potential movement, a privacy score, wherein the privacy score indicates a probability a user of the account identifier shared authentication credentials associated with the account identifier with a second user associated with the second access attempt;
determine whether the privacy score satisfies at least one of a first threshold or a second threshold; and
generate, in response to the determination that the privacy score satisfies at least one of the first threshold or the second threshold, an alert user interface component to configure a graphical user interface of a device associated with the user of the account.

15. The computer program product of claim 14, wherein the processing device processing device is further configured to cause the processor to:
determine, based on the geolocation variance, an indication of impossible movement between the first access attempt at the first time and the second access attempt at the second time; and
automatically deny, in response to the determination of the indication of impossible movement, access to the account.

16. The computer program product of claim 14, wherein the processing device processing device is further configured to cause the processor to:
receive, from the device associated with the user of the account, an indication of an improper authentication; and
deny access, in response to receiving the improper authentication, to the account.

17. The computer program product of claim 14, wherein the processing device processing device is further configured to cause the processor to:
apply a threat level machine learning model to the account identifier; and
generate, by the threat level machine learning model, a threat level indication of the account associated with the account identifier, the threat level indication comprising at least one of a high threat level, a medium threat level, or a low threat level.

18. A computer-implemented method for verification of authentication credentials in an electronic network, the computer-implemented method comprising:
receiving a first IP address associated with a first access attempt of an account at a first time and an account identifier;
determining a first geolocation data of the first access attempt based on the first IP address;
receiving a second IP address associated with a second access attempt of the account at a second time and the account identifier;
determining a second geolocation data of the second access attempt based on the second IP address;
determining a geolocation variance between the first geolocation data of the first access attempt at the first time and the second geolocation data of the second access attempt at the second time;
determining, based on the geolocation variance, an indication of potential movement between the first access attempt at the first time and the second access attempt at the second time;
applying, based on the indication of potential movement, a verification machine learning model to the account identifier;
generating, by the verification machine learning model and based on the indication of potential movement, a privacy score, wherein the privacy score indicates a probability a user of the account identifier shared authentication credentials associated with the account identifier with a second user associated with the second access attempt;

determining whether the privacy score satisfies at least one of a first threshold or a second threshold; and generating, in response to the determination that the privacy score satisfies at least one of the first threshold or the second threshold, an alert user interface component to configure a graphical user interface of a device associated with the user of the account.

19. The computer-implemented method of claim 18, the computer-implemented method further comprising:

determining, based on the geolocation variance, an indication of impossible movement between the first access attempt at the first time and the second access attempt at the second time; and automatically denying, in response to the determination of the indication of impossible movement, access to the account.

20. The computer-implemented method of claim 18, the computer-implemented method further comprising:

applying a threat level machine learning model to the account identifier; and generating, by the threat level machine learning model, a threat level indication of the account associated with the account identifier, the threat level indication comprising at least one of a high threat level, a medium threat level, or a low threat level.

\* \* \* \* \*